A. S. WHITTEMORE.
Thrashing Machine.
No. 90,904. Patented June 1, 1869.
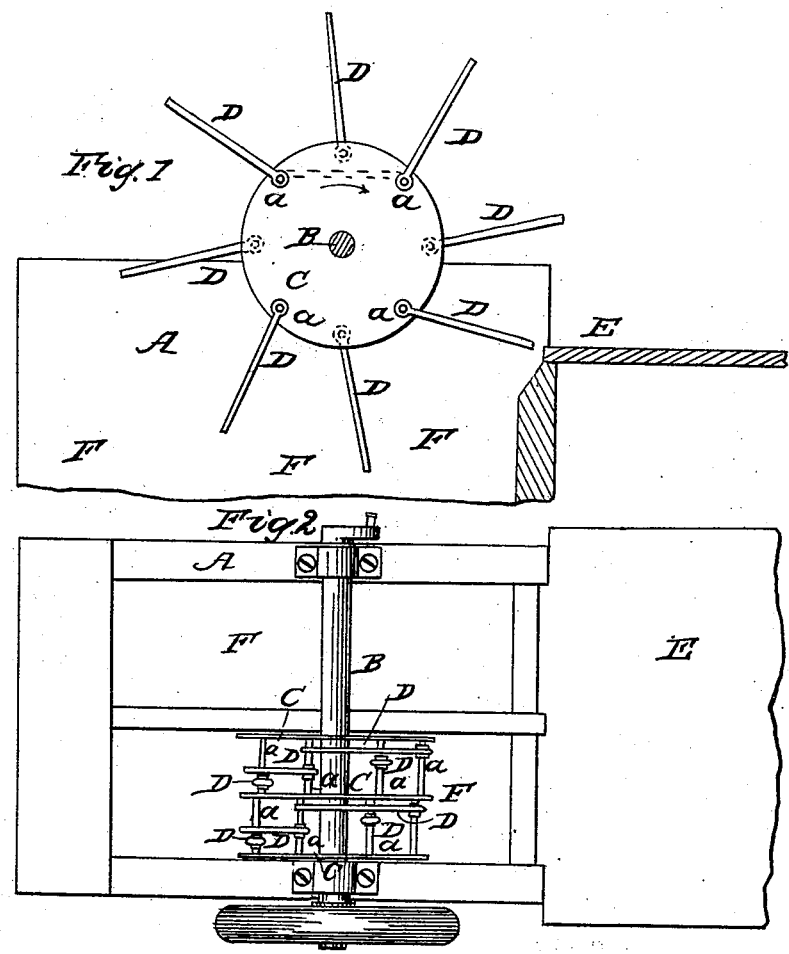

United States Patent Office.

A. S. WHITTEMORE, OF WILLIMANTIC, CONNECTICUT.

*Letters Patent No. 90,904, dated June 1, 1869.*

IMPROVEMENT IN THRESHING-MACHINES.

The Schedule referred to in these Letters Patent and making part of the same.

*To all whom it may concern:*

Be it known that I, A. S. WHITTEMORE, of Willimantic, in the county of Windham, and State of Connecticut, have invented a new and useful Improvement in Grain-Threshers; and I do hereby declare that the following is a full, clear, and exact description of the same, reference being had to the accompanying drawings, which form part of this specification, and in which—

Figure 1 represents a sectional elevation of a grain-thresher constructed according to my improvement; and Figure 2, a plan view of the same.

Similar letters of reference indicate corresponding parts in both figures.

The main object of this invention is to effect the threshing of grain in the most effective manner, with the least possible injury to the straw. In carrying out the invention, I use rotary flails, and thresh the grain while the heads hang unsupported over a bearing, which supports the straw.

The invention consists in a novel arrangement of and mode of attaching the flails, in connection with the shaft which carries them, and in providing, under the shaft and rotary flails, a suitable open space, into which the straw, after passing over the bearing, falls out of reach of the flails.

Referring to the accompanying drawings—

A is a frame, in which is supported, in suitable bearings, a horizontal shaft, B.

Upon this shaft B are carried any desirable number of disks, C.

Passing through these disks C, near their outer edges, and in a direction parallel with the shaft B, and at equal distances therefrom, is any desirable number of pivot-rods, *a*.

Said pivot-rods *a* are arranged equidistant from each other, each one serving as a pivot to one of the pivoted flails D, while the same, taken collectively, serve as a barrier in preventing the wrapping of the straw around the shaft.

Each of said pivot-rods *a* also serves as a stop to the flail before it, said flails being of such length as that, when folded back, will strike against the pivot-rod of the flail behind it, and not fold back upon the shaft B, as has heretofore been the case. While in this position, the unfolding action of the flail is much more rapid, as it has not only less distance to travel in swinging outward, but it is also in a position to yield more readily to the action of centrifugal force.

E is a stationary support, attached to the end of the frame, and situated beyond the action of the flails.

Upon the said support E the stalks of grain, with their heads hanging over, are supported while the kernels are being threshed from the heads by the beating action of the flails.

F is an open space left under the flails, through which the straw, along with the grain thus separated, is allowed to drop out of reach of the flails, and at the bottom of which they may be separated, by means of a riddle or other suitable separating-device, the kernels passing through, while the straw, comparatively uninjured by the operation, may be removed by an endless carrier, raked away by rakes, or gathered by hand and rebound.

What I claim as my invention, and desire to have secured by Letters Patent, is—

1. The arrangement of the shaft and flails, with relation to the floor of the machine, and to the support E, as that the threshed straw, falling from the latter, shall lie beyond the reach of said flails, as and for the purpose herein set forth.

2. The pivot-rods *a*, carrying the flails, arranged relatively to each other, to the flails, and to the main shaft, and in combination with the disks C, substantially as herein described, to prevent the falling back of the flails upon the shaft, and to protect the shaft from the straw.

A. S. WHITTEMORE.

Witnesses:
J. R. ARNOLD,
A. J. GLAZIER.